United States Patent [19]

Theimer et al.

[11] Patent Number: 4,996,912
[45] Date of Patent: Mar. 5, 1991

[54] APPARATUS FOR COOKING FRANKFURTERS

[75] Inventors: Ernst T. Theimer, Rumson, N.J.; Joseph S. Zavagli, Rockford, Ill.; Robert S. Bissett, Tinton Falls, N.J.

[73] Assignee: Lectrofood Corporation, Rumson, N.J.

[21] Appl. No.: 349,075

[22] Filed: May 8, 1989

[51] Int. Cl.$^5$ .................... A23L 3/32; A47J 36/30; B65B 25/22

[52] U.S. Cl. .................... 99/358; 99/349; 99/441; 99/451

[58] Field of Search ............... 99/358, 349, 441, 483; 219/383, 385, 521, 524, 525; 426/107, 113, 234, 244, 246, 114; 206/525, 527

[56] References Cited

U.S. PATENT DOCUMENTS

| | | | |
|---|---|---|---|
| 2,306,573 | 12/1942 | Stern | 99/358 |
| 3,062,663 | 11/1962 | Furgal et al. | 99/358 |
| 3,230,861 | 1/1966 | Korr | 99/358 |
| 3,873,742 | 3/1975 | Miyahara | 426/234 |
| 3,886,290 | 5/1975 | Theimer et al. | 219/386 |
| 3,966,972 | 6/1976 | Theimer et al. | 426/107 |
| 4,099,454 | 7/1978 | Theimer et al. | 219/383 |
| 4,100,302 | 7/1978 | Theimer et al. | 426/107 |
| 4,161,908 | 7/1979 | Miyahara | 99/349 |
| 4,373,431 | 2/1983 | Wallick et al. | 99/483 |
| 4,522,834 | 6/1985 | Miyahara | 99/358 |

Primary Examiner—Timothy F. Simone
Attorney, Agent, or Firm—Bill C. Giallourakis

[57] ABSTRACT

Application of substantial pressure to ends of a frankfurter, concurrent with passing of electrical current, through the application of a cooking tray whose structure accepts multiple frankfurters and allows the pressure to be applied by the use of a carriage system with multiple plungers whose points of contacts serve as electrodes; use of aluminum foil patches between the extremities of the frankfurter and electrode plunger cups is made to maintain conductivity with said aluminum patches being applied by use of a paper tape sprocket system which is microprocessor controlled or in the alternative by manual operator insertion in a modified cooking tray which eliminates the need of the paper tape sprocket system. Application of pressure to extremities of the frankfurter is well in excess of that required for mere electrical contact, but is part of the cooking process for producing a processed frankfurter in less than 40 seconds with high reliability by passing an electric current without burning or arcing. Within the frankfurter, the substantial pressure eliminates voids and provides a consistent electrical contact. The apparatus allows for the use of various brands of frankfurters in as much as a consistent uniform electrical contact is provided by the use of a combined specially shaped plunger which also serves as part of the electrode.

14 Claims, 11 Drawing Sheets

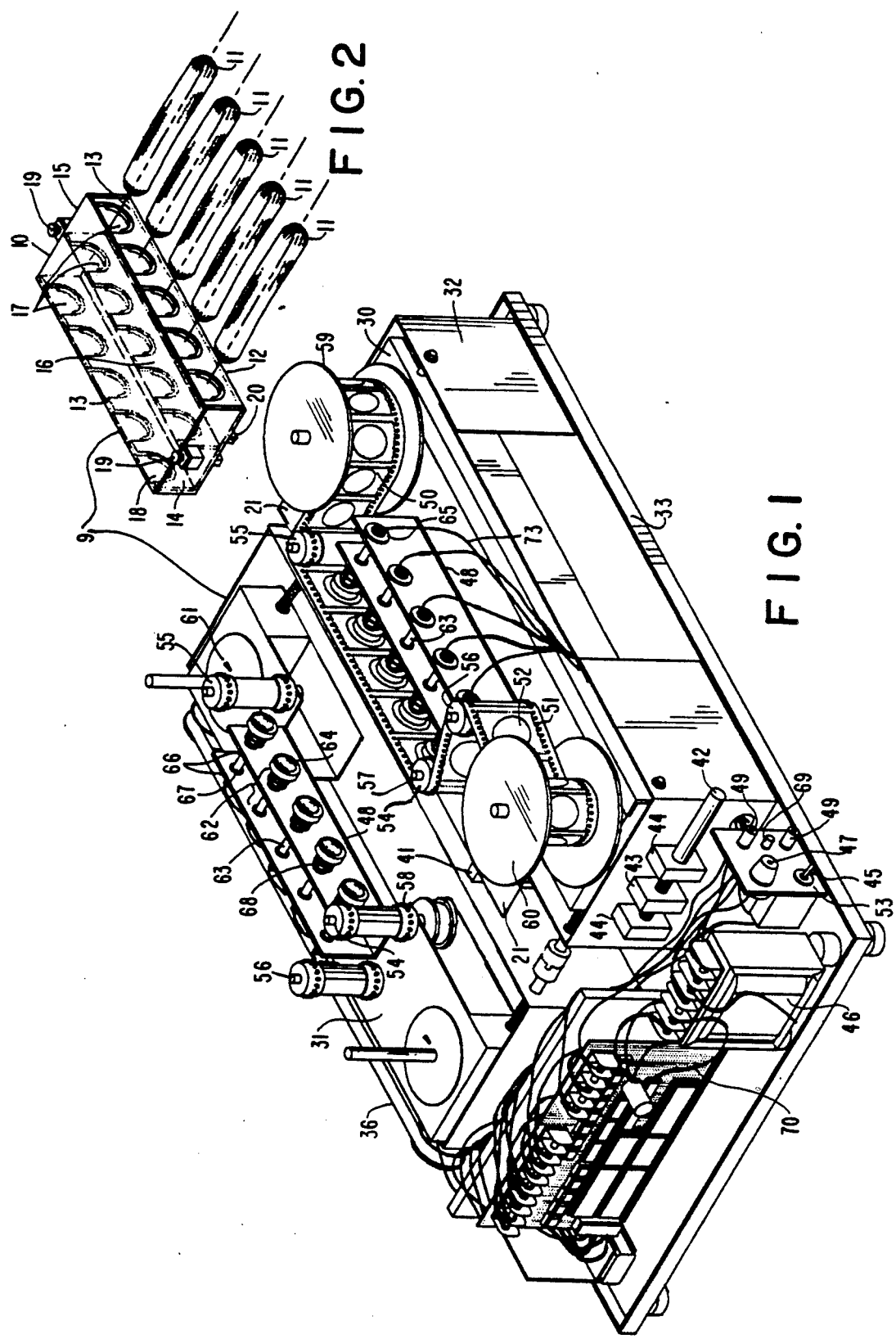

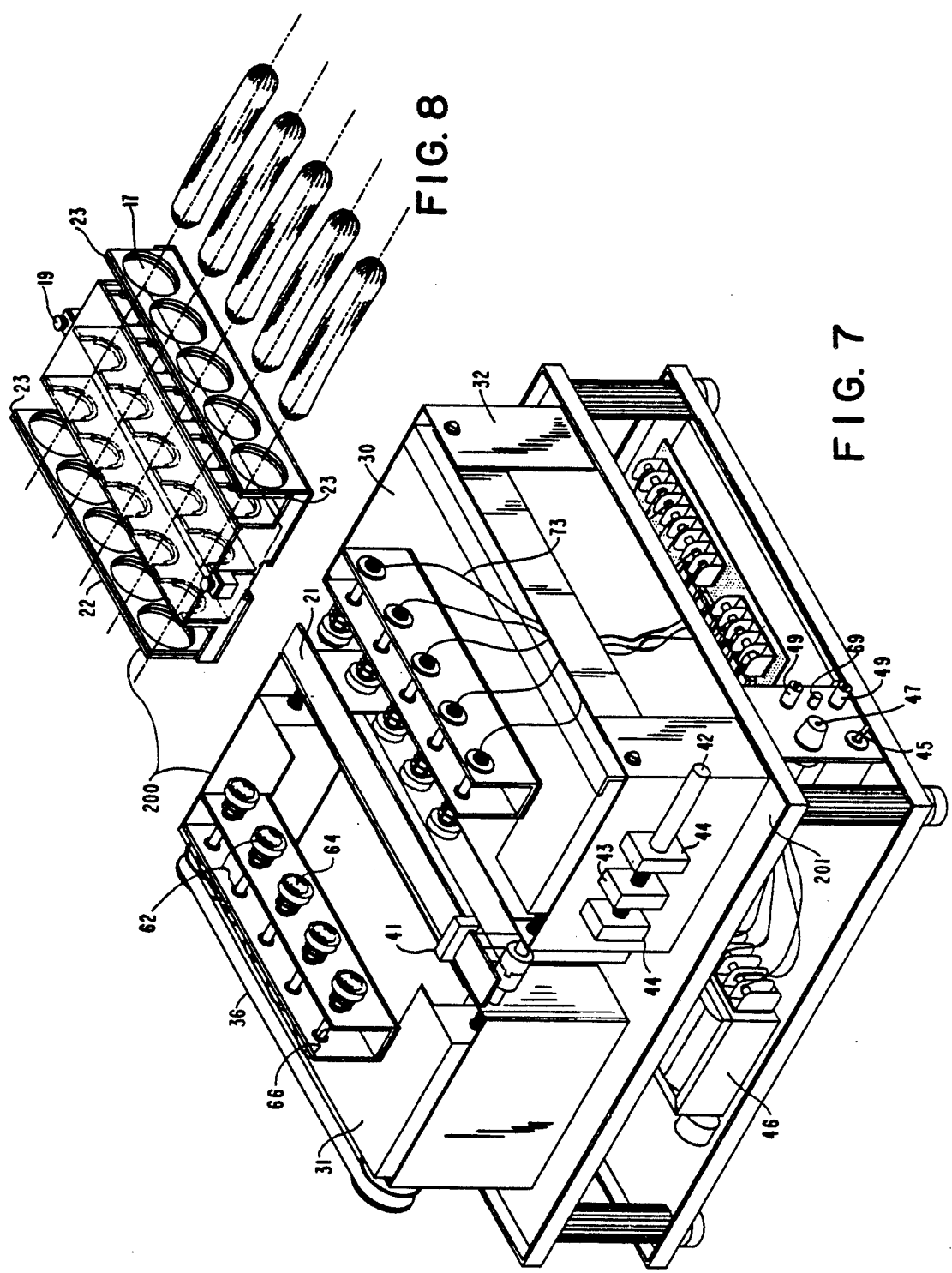

APPARATUS FOR COOKING FRANKFURTERS

FIELD OF THE INVENTION

1. Field of Invention

The present invention relates to a cooking apparatus especially intended for cooking frankfurters over a spectrum of brands, wherein electric current is passed directly through the frankfurters being cooked to complete a circuit, the resistance to the passage of current generates sufficient heat whereby it is cooked in a relatively short period of time, well under fifty (50) seconds.

Electrical resistance cooking of frankfurters is well known in the prior art, however past disclosures possess several disadvantages which are overcome by the present invention. An essential requirement for this type of cooking is establishment and maintenance of good electrical contact between the frankfurter and a set of electrical terminals while cooking. Previous inventions require that electrodes puncture or pierce the frankfurters, or that portions be immersed in electrolytic solutions, or that frankfurter(s) and/or electrode(s) be coated with a given amount of gel/ionic salt compositions in order to satisfy the requirement for sufficient electrical current to flow for frankfurter cooking without arcing or burning. Others use pressure at the ends of the frankfurter to the extent needed to establish electrical contact. The levels of such pressure are far below the levels used in this apparatus. The effect of substantial pressure contact as described in this embodiment is to overcome variations in the cooking amongst various frankfurter brands. The pressure in the manner it is applied reforms the end of the frankfurter to provide a consistent uniform level of conductivity.

The present invention eliminates the need for the above enumerated methods for obtaining the critical electrical contact between electrode and frankfurters while providing a safe and sanitary apparatus in which frankfurter cooking occurs. While other patents having to do with frankfurter cooking employ in various ways some of the elements employed herein, none discloses a similar combination, nor particularly discloses the novel frankfurter tray container specially designed in conjunction with the use of pressure at levels undescribed in the prior art for electrical resistance cooking of frankfurters.

2. Description of Related Art

The electrical resistance cooking of frankfurters or an electrically high conducting food substance in general is well known in the art as described in the following United States patents.

The following cited patents address themselves to cooking packages rather than apparatus for electrical resistance cooking nor does their embodiment resemble the embodiment of the novel frankfurter tray in the embodiments herein:

Richman: U.S. Pat. No. 2,939,793 issued June 7, 1960
Roslonski: U.S. Pat. No. 3,651,752 issued
Korr: U.S. Pat. No. 3,230,861 issued Jan. 25, 1966
Korr: U.S. Pat. No. 3,245,338 issued Jan. Apr. 12, 1966
Korr: U.S. Pat. No. 3,331,285 issued The following patents present apparatus and methods for electrical resistance cooking; however, they require the undesirable use of gel and ionic salt compositions to achieve contact between electrode or electrical contact element and foodstuff.

Hirsch: U.S. Pat. No. 3,565,642 issued Feb. 23, 1971
Theimer: U.S. Pat. No. 3,886,290 issued May 27, 1975
Theimer: U.S. Pat. No. 3,966,972 issued June 29, 1976
Theimer: U.S. Pat. No. 4,016,297 issued Apr. 5, 1977
Theimer: U.S. Pat. No. 4,016,301 issued Apr. 5, 1977
Theimer: U.S. Pat. No. 4,100,302 issued July 11, 1978

The following patents present appliances and methods for electrical resistance cooking, however, they require the undesirable impaling of the subject foodstuff to effect electrical continuity:

Simpkins: U.S. Pat. No. 2,390,277
Ford: U.S. Pat. No. 2,256,976 issued
Steuber: U.S. Pat. No. 2,951,433 issued Sept. 6, 1960
Everett: U.S. Pat. No. 3,117,511 issued Jan. 14, 1964
Ford: U.S. Pat. No. 2,274,325 issued Jan. 24, 1942
Watson: U.S. Pat. No. 2,200,405 issued
McConnell: U.S. Pat. No. 2,139,690 issued Dec. 13, 1938
Aff: U.S. Pat. No. 2,474,390
Speiss: U.S. Pat. No. 2,642,794

The following patents present apparatus and methods for electrical resistance cooking, however, these require the ends of the subject foodstuff to be immersed in electrolytic baths to provide electrical continuity:

Sharpe: U.S. Pat. No. 2,405,984
Berkley: U.S. Pat. No. 2,025,085
Stern: U.S. Pat. No. 2,306,573

Richman, in U.S. Pat. No. 2,794,384 issued June 4, 1957 describes a vending machine incorporating electrical resistance cooking, however, this invention requires the severing of burned portions of meat.

Theimer, in U.S. Pat. No. 4,099,454 issued in July 1978 describes a machine incorporating electrical resistance cooking, gel and ionic salt compositions, a disposable electrode type cooking package, where plunging means cause intimate contact between the electrode and frankfurter end, however the plunging means are not the electrodes as is the case in the primary embodiment herein. Also, the present invention does not require the use of any chemical composition to enhance conductivity.

The following patents present an apparatus which incorporates the optimization of heat transfer by pressurized conduction citing the beneficial effects of pressure; however the method of electrical resistance is not used for the cooking process as is the case of the present invention.

Baker, et al., U.S. Pat. No. 4,444,094 issued Apr. 24, 1984
Sherman: U.S. Pat. No. 4,715,357 issued Dec. 29, 1987

Miyahara in U.S. Pat. No. 4,522,834 describes an electrical resistance cooking machine where resilient connections means apply suitable pressure to hold the foodstuff to be cooked between a pair of electrodes accompanied by salt water containing contact members. The pressure mentioned in this patent U.S. Pat. No. 4,522,834 is only for the purposes of holding the foodstuff in place during the cooking process; it is not commensurate with the applied pressure of the present invention. Plus, there is no need of any electrolytic substance such as salt water in the present invention.

The present invention as hereinafter disclosed obviates the aforementioned disadvantages; it is essentially dry in operation; it is useful as a household appliance; as part of vending machine; as a cooking device in a fast food restaurant; or as a cooking apparatus able to supply the peak demand of a crowd in a sports arena during intermissions. Further, the use of pressure, which is far above the parameters of the prior art provides uniform conductivity regardless of the variations found in the brands of various frankfurter manufacturers without arcing, sparking, burning or causing the frankfurter to split. The applied pressure places the hot dog skin under uniform tension thus eliminating voids within the frankfurter, uniformly distributing the fluids within the frankfurter.

SUMMARY OF THE INVENTION

The disclosure herein describes an apparatus for cooking a frankfurter or a plurality of frankfurters by electrical resistance means under the application of substantial pressure to the diametrically opposite longitudinal ends of the frankfurter(s). The frankurter(s) are received in a holding tray element and contacted on diametrically opposite longitudinal ends by electrodes with aluminum contact members between said electrodes and said ends of frankfurter. The apparatus functions without the problems of the prior art, specifically, without burning, arcing, incomplete cooking, food piercing or use of electrolytic baths and gel/ionic salt compositions.

The invention comprises:

(a) Two carriage elements having their longitudinal cross sectional planes parallel to one another capable of moving toward and away from each other defining a variable width cooking compartment between said carriages.

(b) Electrode means supported on each of said carriages having the frankfurter held within the tray element so electrode means are aligned with exposed opposite ends of frankfurter, providing an intimate electrical contact with said electrode means, aforementioned aluminum contact member between said electrode means and end of frankfurter.

(c) Means of imparting a regulated electrical current for finite period of time to said electrodes, forcing current through frankfurter, cooking same by conversion of electrical energy into heat without undesirable arcing or food burning.

(d) Means of imparting substantial pressure for finite periods of time to diametrically opposite ends of frankfurter, forcing an optimized uniform electrical contact between electrode means, contact members, and said diametrically opposite ends. This pressure, in combination with the frankfurter's skin and the tray configuration, overcomes the variations in conductivity found in frankfurters by removing voids, squeezing out the voids, freeing surplus moisture, thus leads to an ideal frankfurter contact interfaces.

(e) A protective cover which may exist in the opened or closed position, said cover closing the cooking compartment thereby completing the electrical circuit for added safety when it is closed itself.

The invention is more particularly designed for transmission of pressure by use of a holding tray which comprises:

(a) an enclosure defined by a bottom wall of preferably rectangular shape, side walls upstanding from the bottom, the uppermost edges of which define an open top, and a cover or top wall which is mounted on the upper edge secured by fastening means on opposite side walls of shorter length. A plate or plurality of plates upstanding from bottom wall, spaced at predetermined intervals between opposite side walls of longer length, parallel to said opposite side walls. The plate or plurality of plates and said opposite side walls contain apertures circular, semicircular, quasi-semicircular, or any combination thereof which form an imaginary tubular surface or a plurality of tubular surfaces in a row.

The two embodiments of the present invention contain two different tray elements. Present in the first embodiment is a paper tape with aluminum foil patches or panels which act as electrical contact members. The tape moves under controlled means from one spool to another spool to accomplish the accurate and reliable positioning of successive aluminum segments, panels, or patches to predetermined stations as necessary.

The other embodiment provides a groove which runs the entire length of each of the longer length opposite side walls of a tray which still contain the said apertures. The grooves' depth and width is capable of supporting the predetermined dimensional specifications of a pre-cut paper segment with aluminum foil patch contact members acting as electrical contact members.

The electrode means of either embodiment is essentially comprised of rods, each having a food form fitting plunger fixedly attached to one end thereof. To the other end thereof is a lead attached to an electrical source means. The rod is supported by brackets which are fixedly mounted on the top wall of said carriages. The electrode is spring biased to allow for the contraction and expansion of the frankfurter while maintaining the substantial pressure between the electrodes and the frankfurter. The carriages are equipped with means for movement toward and away from each other, hence the variable defined space in between said carriages.

The holding tray of either embodiment as described for the purposes of the present invention was designed primarily to restrain the movement of the frankfurter in order to hold the frankfurter in direct line with the longitudinal force being applied by the combined electrode-plunger means. The aperture size must relate to the frankfurter diameter so as to restrain the frankfurter from buckling under the high pressure adopted in the present invention, but not allow the frankfurter to burst as it swells during the cooking process. It must also allow for longitudinal centering of the frankfurter and for after cooking easy removal of the frankfurter. The bottom wall contains drain holes for the juices. Both tray elements feature a guide on the bottom wall mounted on a rail so as to provide to the holding tray a horizontal degree of freedom, running on a line through the carriage, while preventing any vertical movement.

The holding tray in its cooking position located between the carriages comprises the cooking compartment. With the tray in the cooking compartment and the apertures aligned directly with the electrode means, the carriages will advance toward each other. At a controllable instant the carriages stop thus providing an intimate electrical contact between the electrode means and the frankfurter and the electrical contact members in between draping the tray apertures. The electrode means mounted on the carriages also serve to provide a reliable constant pressure for the duration of the cooking process.

Electrical current regulating means are provided within the furnished electrical circuit to impart a continuous stream of electrical energy in the proper amount for the required time period.

Pressure regulating means are provided within the furnished carriage drive mechanism to impart a continuous amount of pressure for the required time period.

It is therefore an object of the present invention to provide an appliance used for the electrical resistance cooking of one or more frankfurters which is alternatively useful as a household appliance, a cooking instrument in a fast food restaurant, as the cooking component of a frankfurter vending machine; and use in sports arenas and stadiums.

It is also an object of the present invention to provide an appliance useful for electrical resistance cooking of one or more frankfurters which is easy to operate reducing manual operations, and is inexpensive to manufacture.

It is another object of the present invention to provide an appliance useful for electrical resistance cooking of one or more frankfurters which assures intimate electrical continuity without food piercing, use of gel and ionic salt compositions, or electrolytic solutions.

It is a further object of the present invention to provide an appliance useful for electrical resistance cooking of one or more frankfurters which positions them properly with respect to the electrodes and holds the food in place for the entire cooking process.

It is still another object of the present invention to provide an appliance useful for electrical resistance cooking of one or more frankfurters which safely imparts to the frankfurters a regulated electric current in an amount sufficient for thorough cooking.

It is still a further object of the present invention to provide an appliance useful for electrical resistance cooking of one or more frankfurters which safely imparts to the frankfurters a regulated amount of pressure to ensure a reliable consistent frankfurter electrode contact interface regardless of brand of frankfurter.

Another object of the present invention is to provide an appliance useful for electrical resistance cooking of one or more frankfurters which completely cooks the subject number of frankfurters swiftly and without undesirable arcing, burning, or bursting.

These and other objects of the invention will become apparent upon consideration of the detailed description of the preferred embodiment.

BRIEF DESCRIPTION OF THE DRAWINGS

FIG. 1 is an exploded perspective view illustrating the various operating mechanisms of the electrical frankfurter resistance cooker.

FIG. 2 is a perspective of the holding tray element in its extended non-cooking open position to more clearly illustrate the features of construction.

FIG. 7 is a perspective illustrating the operating mechanisms of the electrical resistance cooker of the alternate embodiment.

FIG. 8 depicts the holding tray element of the alternate embodiment in its extended noncooking open position to more clearly illustrate features of the construction.

DETAILED DESCRIPTION OF THE PREFERRED EMBODIMENT

Figure 3:
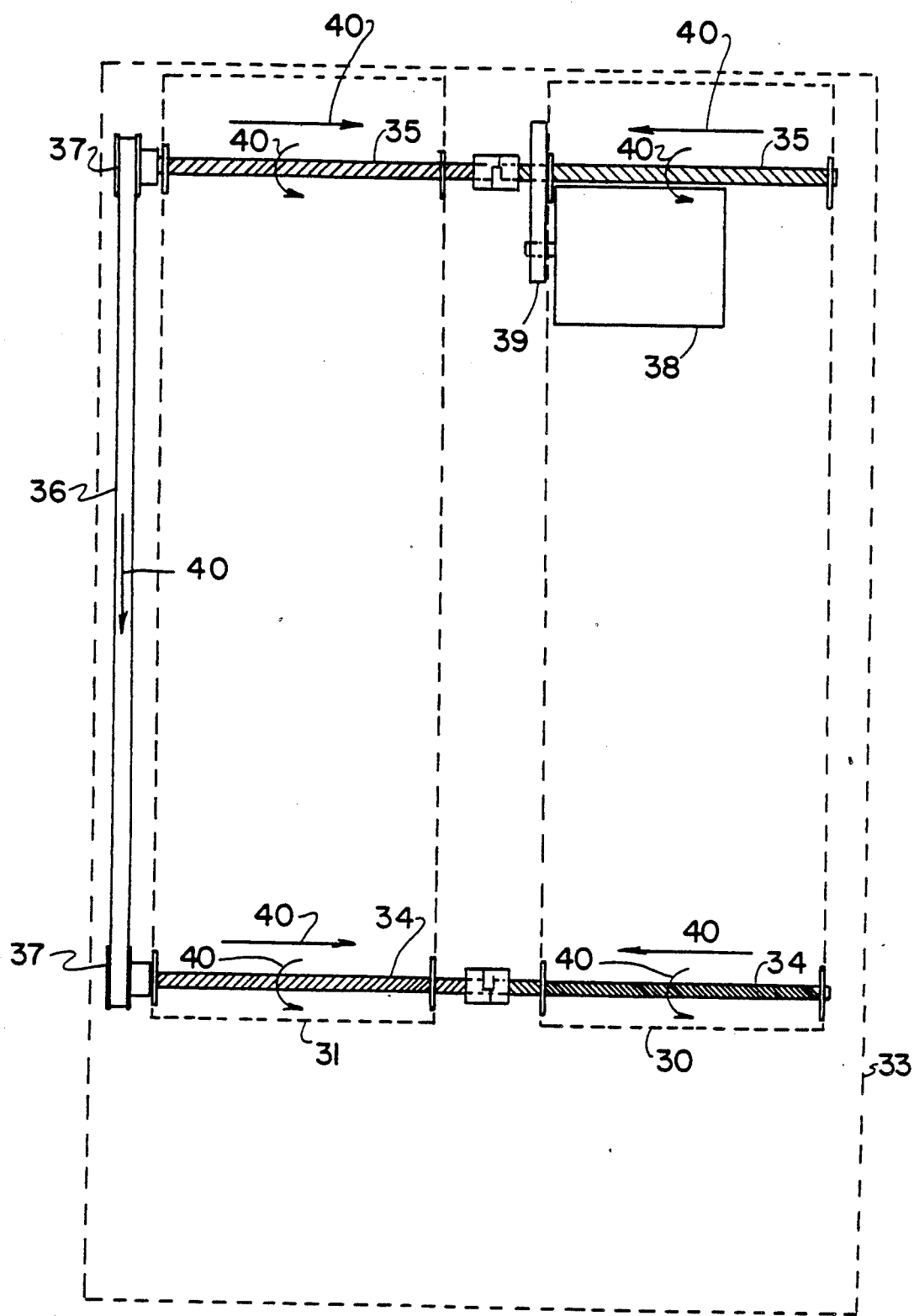
FIG. 3 is a top cross sectional view of only the carriage system and corresponding drive mechanisms which move in and out carrying the multiple electrodes and tape tractor system.

Referring now to the drawings, FIG. 1 depicts the preferred embodiment of the internal operating apparatus of this disclosure.

FIG. 2 shows the tray 10 which is a key feature of the apparatus 9. The object of the tray's 10 new design is to enhance the internal cooking mechanisms within the frankfurter 11 itself by providing the ability to apply substantial pressures to the ends of a frankfurter 11 without causing the frankfurter 11 to bend or burst during the cooking cycle. It is this tray 10 whose unique design and construction prevents the frankfurter 11 from buckling as occurs in the prior art, which buckling prevents the application of the necessary pressure during the cooking cycle. The tray 10 generally shall have a bottom 12 of rectangular shape, side walls 13 upstanding from the bottom, a front wall 14 upstanding from bottom, a rear wall 15 upstanding from bottom, a wall 16 upstanding from the bottom midway between side walls, apertures 17 in side 13 and middle walls 16, juice drain holes (not shown) in bottom and a lid or cover 18 fastened by screws 19. The use of thumb screws 19 is but one means by which the tray cover 18 is fastened to the tray 10 itself. The tray 10 has a tray guide 20 designed on underside of bottom wall 12, which engages a guide rail 21 as to allow motion along said guide rail 21. The tray 10 is designed to restrain movement of a frankfurter 11 and to cause the frankfurter 11 to stay in line as force is applied by the electrodes 62. The opening size of the apertures 17 relate to the diameter of the frankfurter 11 so that the apertures 17 will restrain the frankfurter 11 but not cause the frankfurter 11 to burst as it swells up during cooking. It is anticipated that the tray 10 will be produced by injection molding techniques.

FIG. 3 depicts the two carriages 30,31 capable of moving toward and away from each other or in the terminology of this invention on an in or compressing cycle and an out or retracting cycle, by use of a drive mechanism housed inside the carriage casings 32 of FIG. 1. The carriage casing 32 being mounted on a support base 33 in FIG. 1.

Figure 5:
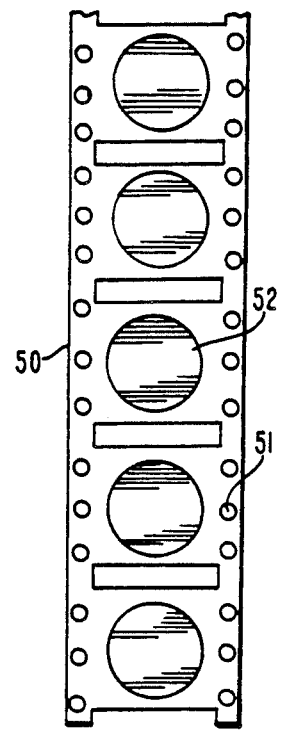
FIG. 5 is a side view of the paper tape with its perforations showing the aluminum foil windows contained thereon against which the plungers impinge.

FIG. 1 and FIG. 5 depict the paper tape 50 having holes or perforations 51 at intervals along its length in both margins of said tape 50, also having square aluminum foil patches or panels 52 at intervals along its length which are fitted over circular apertures. This tape 50 is made of electrically nonconducting paper or other nonconducting material which is tear resistant. Within the paper tape 50 are positioned isolated aluminum foil patches 52 which serve as spaced contacts between a frankfurter 11 and a plunger electrical contact 64. The aluminmum foil patches have a thickness of approximately 0.1 to 0.6 mils(0.1 to 0.6×10 to the minus 3 inches). The purpose of the aluminum foil is to prevent the build-up of food particles on the ends of the electrode 62 surfaces 64. The food particles cause contamination and the reduction of the conductivity of the electrodes 62. The increase in sanitation from a food service point is obvious. Plastic conducting material could be used in lieu of aluminum. The aforementioned paper tape 50 is intended for use in a tractor mechanism for completing the electrical conduction path between the frankfurter 11 end and the mechanical means encompassing the electrodes 62, when the tray 10 is in cooking position. In other words, the tape 50 when driven and controlled with the desired motions with respect to time and distance must be continuously engaged and advanced to successive segments so that the tape 50 undergoes only the motions desired.

A tractor mechanism for accomplishing the above is shown diagrammatically in FIG. 1 (only one entire mechanism is shown so as not clutter the FIG. 1), comprising the tape 50 trained around drive drum 54, positioning drum 55, and tape idler drum 56. Each drum is supported by a shaft 57 for rotation.

The shaft 57 supporting the drive drum 54 is driven by a motor(not shown on the drawings) which pulls the tape 50 from the tape supply spool 59. The tape idler drum 56, tape positioning drum 55, and tape drive drum 54 all have pins 58, provided in the peripheries of their structure at intervals corresponding to the spacing of the perforations or holes on the tape 50, for the purpose of engaging the tape 50 perforations or holes 51. The tape drive drum 54 is controlled by the microprocessor 70 which turns the tape drive drum 54 on or off based on feedback from the tape positioning drum 55.

The tape positioning drum 55 is designed to maintain the vertical position of the tape 50 along the path of travel from the tape supply spool 59 to the spent tape take up spool 60. Also the tape positioning drum 55 counts the perforations 51 for feedback to the microprocessor 70 for control of the tape advance and registration of tape foil pads 52 with frankfurter 11 and tray 10. The counting of tape perforations 51, which are translated into the location of the aluminum foil patches 52, is accomplished by the use of an encoding wheel and a microswitch mounted at the base of the positioning drum 55.

The tape supply spool 59 is fitted with a friction clutch to maintain tension. A lug 61 fits into the bottom of the tape supply spool 59 to engage either drive and-/or friction device means.

The spent tape take up spool 60 is driven, but is equipped with a friction slip device so that take up tension is released when excessive. This also compensates for the varying diameter of the tape 50 as it builds up in the spool 60.

FIG. 1 further describes a plurality of pairs of pushrods 62, each comprising a solid, cylindrical plunger 63 having fixedly attached to one end thereof a hemispherically concave food form fitting depression 64 in its opposite end; the other end of the pushrod 62 is attached to an electrical circuit 73.

A pair of electrode support brackets 66 each having one of said pushrods 62 slidably mounted in a tubular cavity therethrough, said brackets 66 being fixedly mounted on carriage housing 30, 31 in such a manner as to allow said plungers 63 to be directly aligned with previously described tray 10 apertures 17 when tray 10 is in the cooking position.

Figure 4:
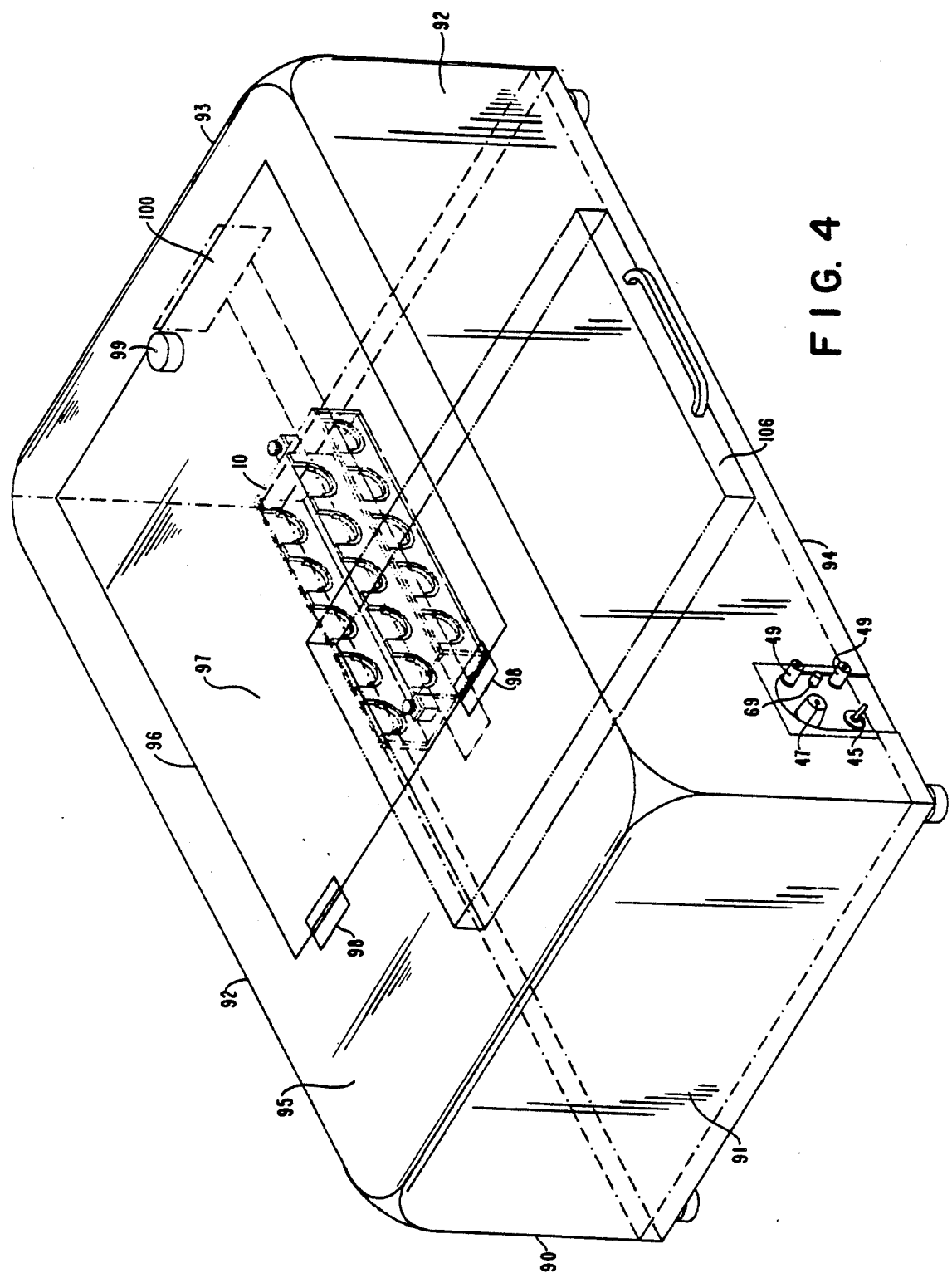
FIG. 4 is a line prespective illustrating the cover for electrical resistance cooker of FIG. 1 with the lid cover in the closed position, permitting a "ghost" illustration of the holding tray and juice tray in their respective cooking positions.

FIG. 4 shows the cover 90 of the apparatus 9 described in FIGS. 1 and 2. The cover 90 is of rectangular shape corresponding to the configuration of previously described operating mechanism 9 and comprises a front wall 91, side walls 92, a rear wall 93, and a bottom 94. The top 95 is coterminal with the upper edges of all designated walls 91,92,93 and contains an aperture 96 which is closed by a cover 97 of insulation which is mounted by hinges 98; and which cover 97 triggers a switch signalling to the microprocessor that the cover 97 is closed. Attached to the cover 90 is a knob 99 to open and shut the top cover 90. The rear wall 93 contains an aperture 100, whose dimensions accommodate the insertion of the tray 10. Aperture 100 comprises a door and switch to signal its closure not shown herein. The front side walls 94 are fitted with the means for the attachment to an electrical source. The wall structure is of an electrically insulating material which also has heat insulating properties. FIG. 4 also reflects a ghost image of the frankfurter 11 holding tray 10 in its cooking position with a tray 106 immediately below it for catching the juices as the frankfurter(s) 11 is put under pressure and electrically cooks.

Cover 90 has a drip tray access switch which signals to the microprocessor when the tray 106 is in proper position.

FIG. 3 shows a basic schematic diagram of the two carriage drive system 33 which is responsible for moving in and out thus opening and closing the electrical circuit through the frankfurters 11 during the cooking cycle. The carriage drive system 33 comprises a right side carriage 30 and a left side carriage 31. The right side carriage 30 houses a motor 38 connected to a gear drive 39 which transmits drive power to the carriage drive screw 35. The left carriage 31 contains a timing belt 36 through two drive pulleys 37 which transmits power to the carriage drive screw 34, allowing the carriages 30,31 to move in unison toward or away from each. The orientation of the arrows 40 reveals the carriages 30,31 moving toward each other. Carriage system 33 has a compression adjustment screw 42 shown at FIG. 1 which allows the operator to adjust the position of stop which activates the microswitch to control the position for compression of the frankfurters on the in cycle. At FIG. 1 an adjustable bracket 43 is provided which moves laterally, as the compression adjustment screw 42 is turned, by riding in a slot cut into the machine case and which extends into the case 32 thus engaging the microswitch. Brackets 44 remain stationary.

A carriage open stop switch (not shown in figures), which is adjustable, is provided so that when the frankfurters 11 have completed the cooking cycle, the carriages 30,31 will retract to enable the tray 10 to be removed. The carriage open stop switch stops the carriages 30,31 at the fully retracted position which can be adjusted to various settings.

OPERATION OF THE PREFERRED EMBODIMENT

Using FIG. 1 the operator applies power to the apparatus 9 by throwing the On/Off toggle switch 45 to the on position. A step down transformer 46 is provided with the apparatus 9 to provide lower voltages for controls. The carriage system at FIG. 3 though is driven by a 220 volt motor 38.

Thereafter the operator sets the current level adjustor 47. This setting establishes the maximum allowable current level on any particular cooking cycle that when reached shall shut down the cooking cycle. The higher the setting the higher will be the temperature in the frankfurter(s) 11. Probe jacks 49 are used to read the value of the current level adjustor 47 by use of a voltmeter or similar instrument. The maximum allowable current level is determined to be between 3 and 4 amperes, depending on the composition of the frankfurter. Such a setting equates to a final temperature of 140 to 150 degrees Fahrenheit inside the frankfurter which is the desired temperature for consumption.

Table 1 below indicates cooking times as a function of the internal temperature of the frankfurter at the time the cooking cycle is started, current levels, and internal temperature of the frankfurter at the end of the cooking cycle.

TABLE 1

| Start Temperature (degrees F.) | End Temperature (Degrees F.) | Start Current (amps) | Ending Current (amps) | Cook Time (sec) |
|---|---|---|---|---|
| 38–40 | 140–150 | .75–1.00 | 3.25 | 35 |
| 54 | 140–150 | .75–1.00 | 3.25 | 23 |

Referring to FIG. 1, the tray 10 is removed from the cooking compartment by retracting the tray 10 along sliding guide bar 21. A frankfurter 11 or a plurality of frankfurters 11, in this case a maximum of five, are then deposited into the tray 10 expecting the diametrically opposite frankfurter 11 ends to be exposed. The cover 18 of the tray 10 is then fastened by the screws 19 to the outer edges of shorter length opposite walls 14, 15. The tray 10 is then moved inwardly along the guide rail 20 through the aperture 100 at FIG. 4 of the rear wall 93 of the operating cover 90 and into the space between the carriages 30, 31 of FIG. 1 known as the cooking compartment. The guide 20 and guide rail 21 not only cause the tray to be centered and properly positioned in the cooking compartment, but also restrain the tray 10 from vertical movement.

Figure 6:
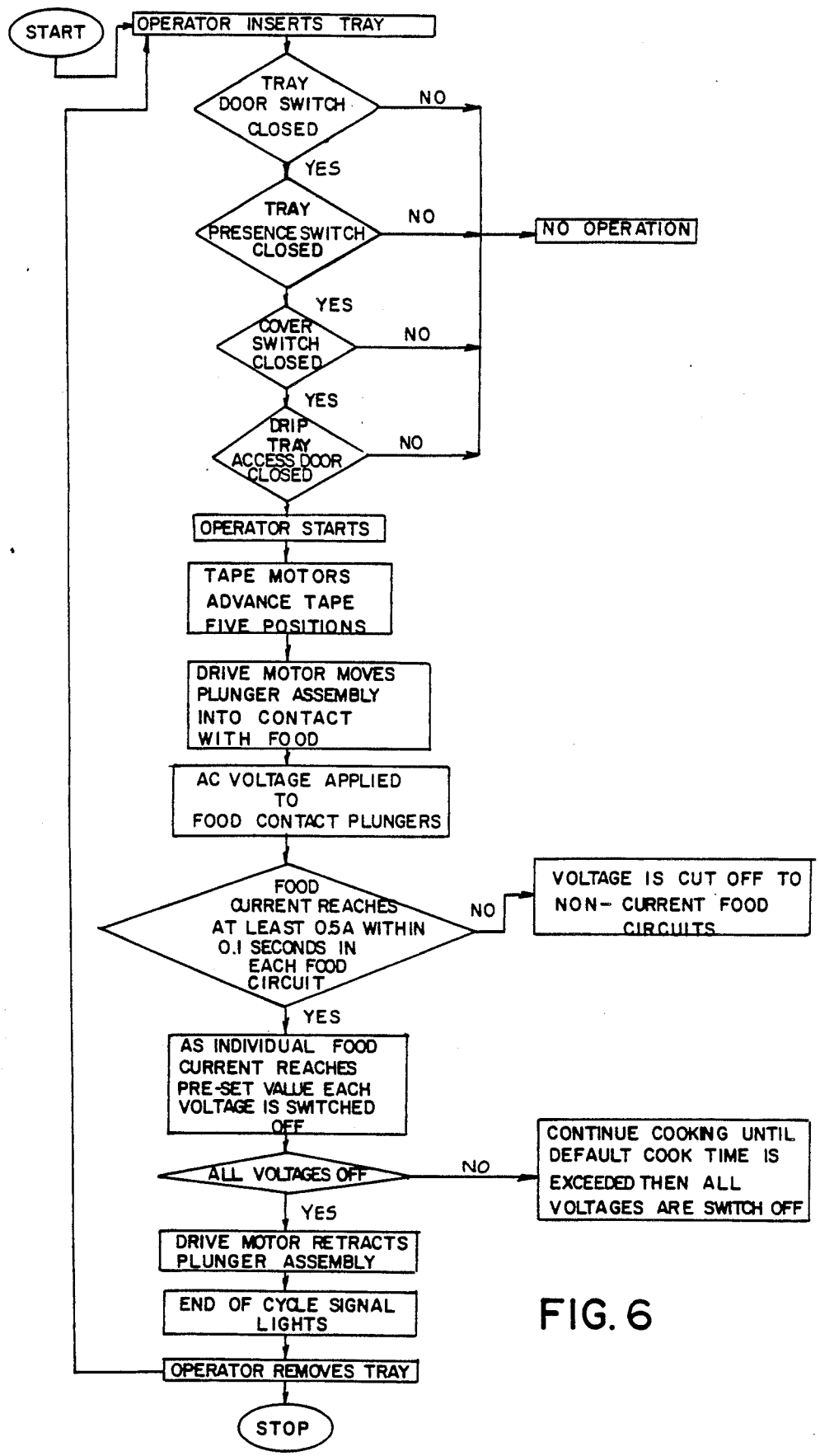
FIG. 6 is a flow chart depicting the operational sequence of events of the apparatus wherein the food contact plungers also serve as the electrodes.

Referring to FIG. 6 in conjunction with FIG. 1 and FIG. 2, one skilled in the art will find a flow diagram of the major events described further below herein which encompass and define the cooking cycle.

When the operator inserts the tray 10 a number of switches as indicated at FIG. 6 must be sensed by the microprocessor 70 as being closed in order for the apparatus 9 to be started by the operator.

The tray 10 engages the tray position switch 41, a microswitch. This microswitch 41 is closed by the frankfurter tray 10 assuring that the tray 10 is present, in place and in registration. If the tray position switch 41 is not closed, but in the open position, the cooking cycle of the apparatus 9 cannot be initiated.

The pressure is preset to the frankfurter(s) 11 by adjusting the compression adjustment screw 42 which activates a microswitch to control the position of the carriages 30, 31 relative to each other after the completion of the in cycle. The screw 42 is supported by two brackets 44. The third bracket 43 moves with the turning of the screw 42 and extends into the carriage casing 32, riding in a slot in the casing 32 to engage said microswitch. As the carriage movement nears its end of completion of the in cycle, increased pressure is applied as the plungers 62 with their cups 64 subsequently urge the tape with the aluminum foil electrical contact patch 52 to an intimate form fitting contact with the ends of the frankfurter(s) 11.

The cups 64 are one inch in diameter. The plungers 62 which also serve as the electrodes 62 have a preload pressure of 2.75 pounds or 2.161 pounds per square inch. The final pressure at the end of the cooking cycle equals 3.5 to 3.75 pounds which equates to 2.75 to 3.0 pounds per square inch. Too high a pressure results in the splitting of the frankfurter 11 which is unacceptable. Lower pressures result in failed cooking cycles culminating in sparking, burning and/or erratic cooking. Successive usage of the aluminum contact patch 52 is possible for multiple cooking cycles at the discretion of the operator.

Table 2 below summarizes the key design data as related to the effects of pressure on the electrical cooking of the frankfurter(s).

TABLE 2

| Pressure(Lbs/sq.inch) | Effect |
|---|---|
| Less than 2 | Voids at ends; inconsistent conductivity at extremities versus conductivity in interior of frankfurter; does not overcome non-conformed ends of various brands; cannot compensate for erratic shapes of various brands; cause sparking and unreliable cooking. |
| 2.7–3 | Provides uniform contact interface to extremities of frankfurter; provides uniform shaped contact area for electrodes; overcomes variations in conductivity between brands; eliminates voids; squeezes out moisture in extremities of standard manufactured brands; reforms the ends to constant shape. |
| greater than 4 | frankfurter splits |

Referring again to FIG. 1, the apparatus 9 also provides for the isolation of the electrode support brackets 66 from the machine 9 electrically be dielectric strips 48. Dielectric bushings 67 are used for the screws of the hold down electrode brackets 66. Further, dielectric bushings 67 for wherever electrodes 62 go through supporting brackets 66 are used. Dielectric washers 65 are used to avoid electrical contact when the electrodes 62 are in the open position.

In FIG. 4 when the operating cover's 90 lid 97, tray 106 and door 100 are closed, a regulated current from the power source is imparted to the completed circuit cooking the frankfurter 11 under pressure without arcing or burning. Without the substantial pressures previously cited during the cooking cycle, the frankfurters 11 would be prone to arcing or sparking. The frankfurter 11 structure produces an electrical resistance resulting in generation of heat within the frankfurter 11 effecting rapid cooking of the latter, usually within less than one half a minute. The biased electrode springs 68 allow for the expansion and contraction of the frankfurter(s) 11 as they cook while concurrently applying the proper compression to the ends of the frankfurter 11 when the carriage position is adjusted correctly. Upon completion of the cooking cycle, the carriages 30, 31 retract and the tray 10 is removed along the guide rail 21 through door 100. The frankfurter(s) is now available for consumption.

Figure 12:
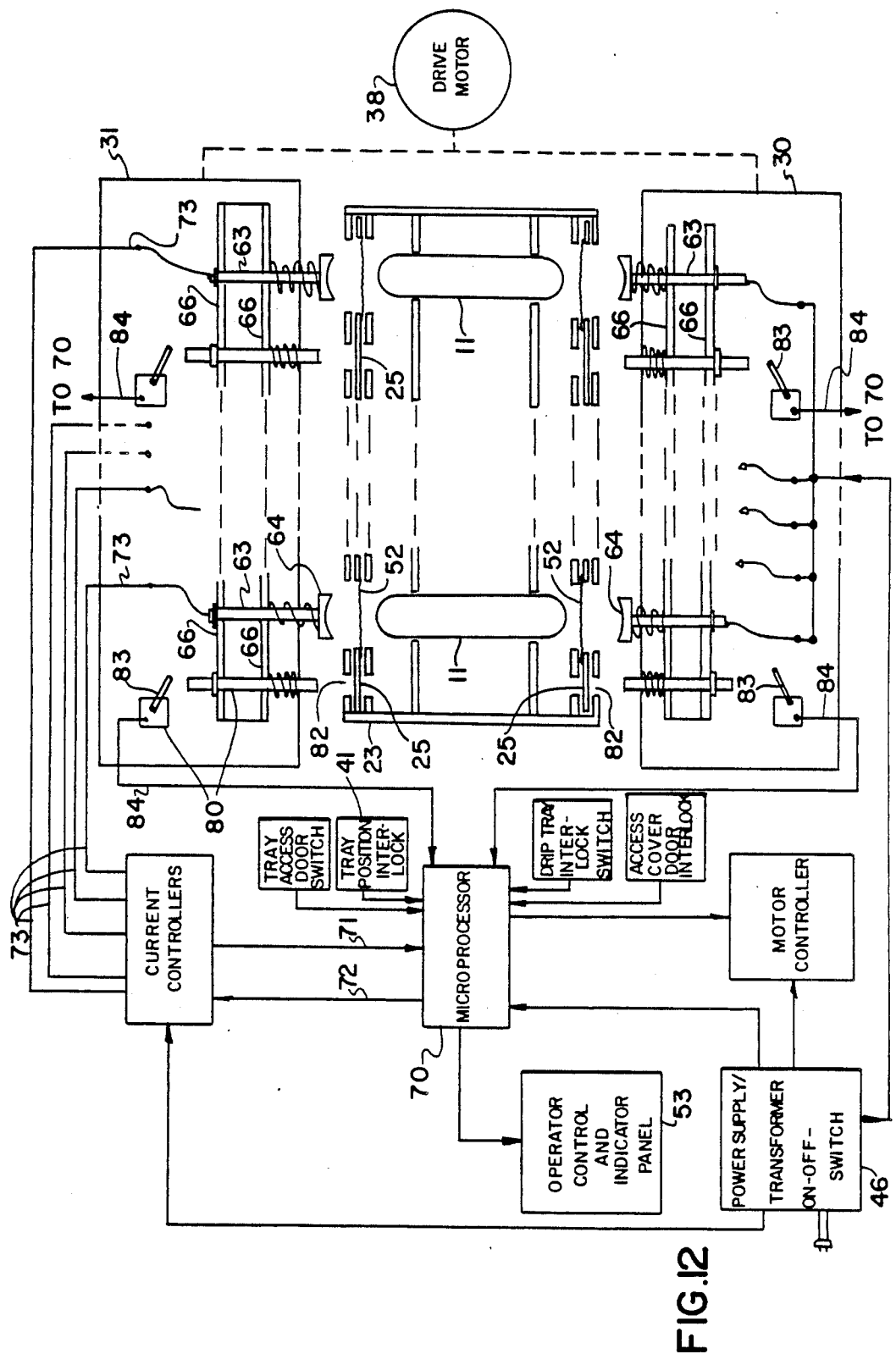
FIG. 12 is a block diagram depicting the general overall interconnection of all the major subsystems with the microprocessor of the cooking apparatus with emphasis on the current and pressure control systems without the paper tape drive system described in the first embodiment.

Referring to FIG. 12, the microprocessor 70 used with the various embodiments herein receives current sensing signals 71 to confirm the presence of a frankfurter 11 within one of the multiple circuits 73. If the current does not reach at least 0.5 amperes within 0.1 seconds, the microprocessor 70 sends a current control signal 72 to cut-off voltage to those food circuit(s) 73 which do not meet the current requirements.

DETAILED DESCRIPTION OF THE ALTERNATE EMBODIMENT

FIG. 7, 8 depict the alternate embodiment of an apparatus 200 which is similar to the first cooking apparatus 9 except that the paper tape 50 and its drive system 54 with its various spools 57,58 shown at FIG. 1 which provided for the automatic advance of the tape 50 are eliminated.

Figure 10:
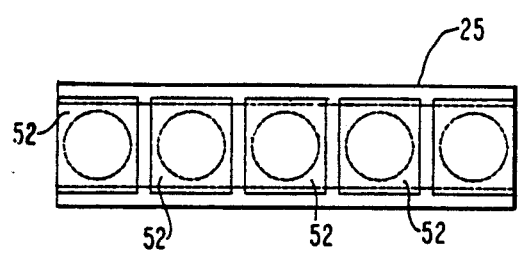
FIG. 10 is a front view of the manual insertion card of five aluminum foils which fit into the revised tray.

Furthermore, the frankfurter tray 10 is redesigned and this augmented tray 22 is depicted at FIG. 8,9. The augmented tray 22 is redesigned in such a configuration to allow for the apparatus operator to manually insert as shown at FIG. 10 the aluminum foil contacts 52 in segments 25 into slots 23 in lieu of using the previously described tape 50 drive sprocket system. One could use an entire strip of five sections 25 or less as shown at FIG. 10 each time when using a tray 22 with a five frankfurter capacity. It is also envisioned that one could have a family of trays 22 for various quantities from one to five frankfurters 11 to be cooked.

In this embodiment 200 of FIG. 7, the power system 46 at FIG. 1 and microprocessor control system 70 of the apparatus 9 at FIG. 1 are relocated under the carriages 30,31 by use of a raised platform 201, thus requiring less space in an overall fast food cooking facility with its limited counter space.

FIG. 8 depicts the redesigned frankfurter tray 22.

Figure 9:
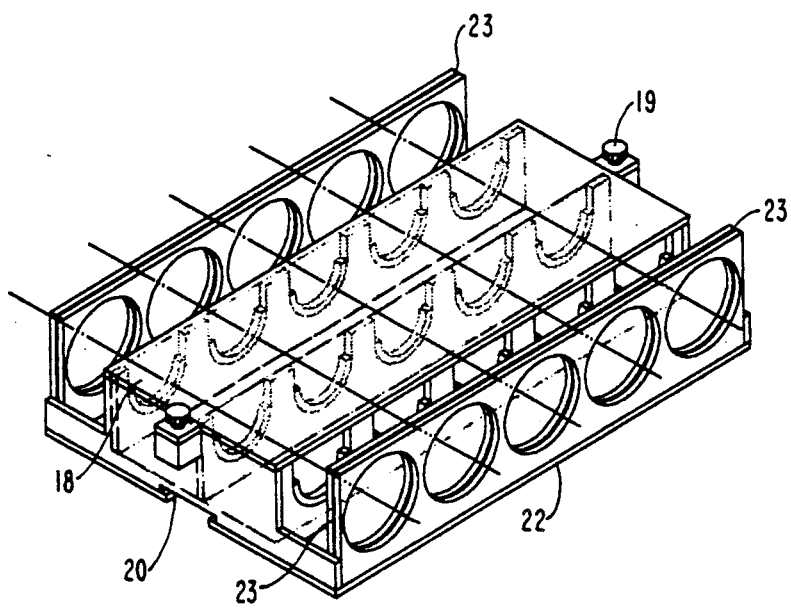
FIG. 9 is an enlarged blown up perspective drawing of the revised tray.

FIG. 9 is a detailed close-up dimensional view of tray 22 which is obvious to one skilled in the art.

FIG. 10 is a front view of the aluminum foil insert 25 which is inserted into the two recesses 23 of tray 22.

Figure 11:
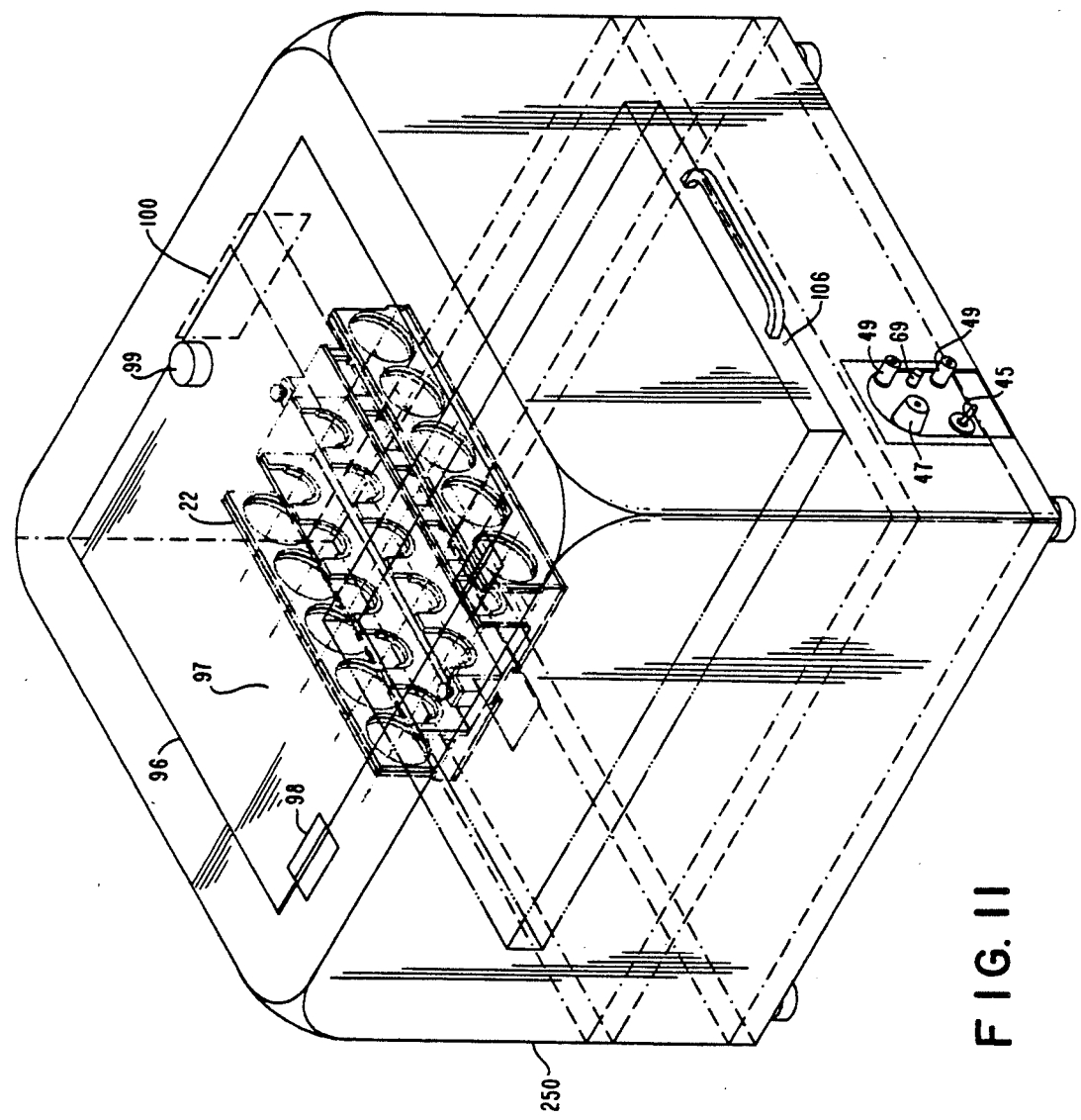
FIG. 11 is a perspective view of the cover for electrical resistance cooker of FIG. 8 with the lid cover in the closed position, permitting a "ghost" illustration of the holding tray and juice tray in their respective cooking positions.

FIG. 11 reflects the redesigned cover 250 which is similar in operation and function to the cover 90 of the preferred embodiment. The application of substantial pressure remains the novel feature also for this alternate embodiment which is the key to cooking the frankfurters 11 without arcing, sparking or splitting the frankfurter skin.

FIG. 12 depicts the microprocessor 70 used in all embodiments described herein. FIG. 12 shows by block diagram all the major control systems as they relate to the activity in the cooking compartment. In this alternate embodiment, the tape spool drive system has been eliminated and in its place a paper nonconducting card 25 with aluminum foil inserts 52 is used.

In order to determine the presence of the card 25 with aluminum foil inserts 52, a foil sensor 80 is used. As the carriage 31 moves in to engage the plunger cup 64 with the frankfurter 11, the sensor rod 81 moves through an aperture 82 touching the the card 25 holding the aluminum foil inserts 52. This action causes the sensor rod 81 to engage the foil sensor switch 83, closing the switch 83 and sending a signal to the microprocessor 70 that a card 25 has been inserted by the operator. The absence of the card 25 prevents closing the foil sensor switch 83 for that particular food circuit 73; but would merely allow the sensor rod 81 to pass through the open aperture 82 unobstructed; thus not allowing A.C. voltage to be applied to that particular food circuit 73.

This embodiment 200 of an apparatus for cooking frankfurters 11 has the advantage of fewer mechanical moving parts yielding the potential for higher reliability. The embodiment 200 enhances sanitation further since the tape spools 54, 55, 59, 60 are eliminated. Ease of operation of the cooking apparatus 200 is promoted due to the manual insertion of the aluminum foil insert 25.

Although not depicted, it should be obvious to one skilled in the art that further simplification can be obtained by eliminating the drive motors 38 which power the carriages 31,32 by using mechanical-manual means to effect the opening and closure movements of the carriages 30,31, thus decreasing cycle time.

OPERATION OF ALTERNATE EMBODIMENT

Figure 13:
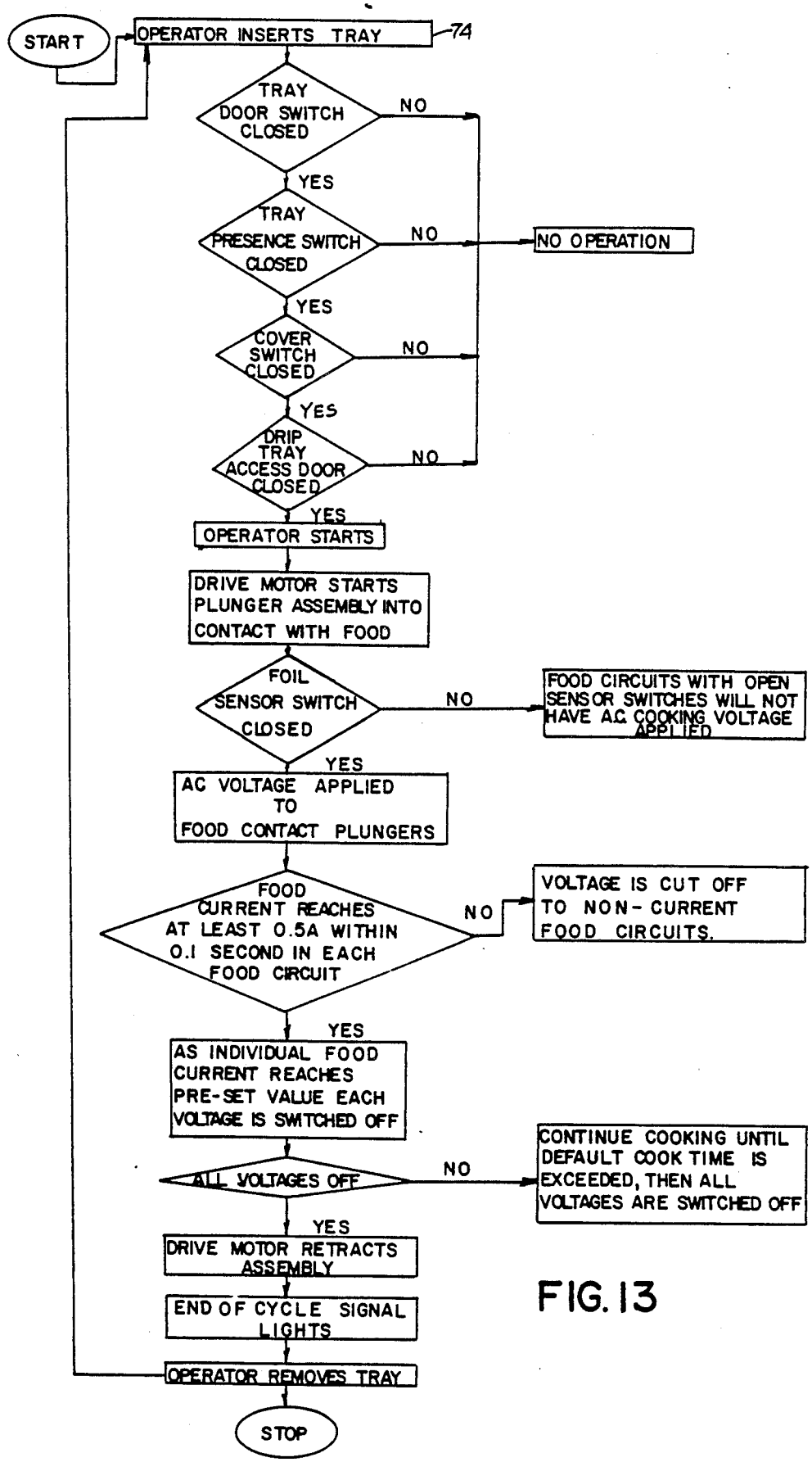
FIG. 13 is a flow chart depicting the operational sequence of events of the apparatus wherein the voltage is applied to the plungers and the foil contact rods are used to detect the presence of a five position card.

The operation of this alternate embodiment is similar to that described for apparatus 9. FIG. 13 provides a flow chart of the embodiment which employs the use of a foil sensor 80 as described above which is easily understood by one skilled in the art.

Figure 14:
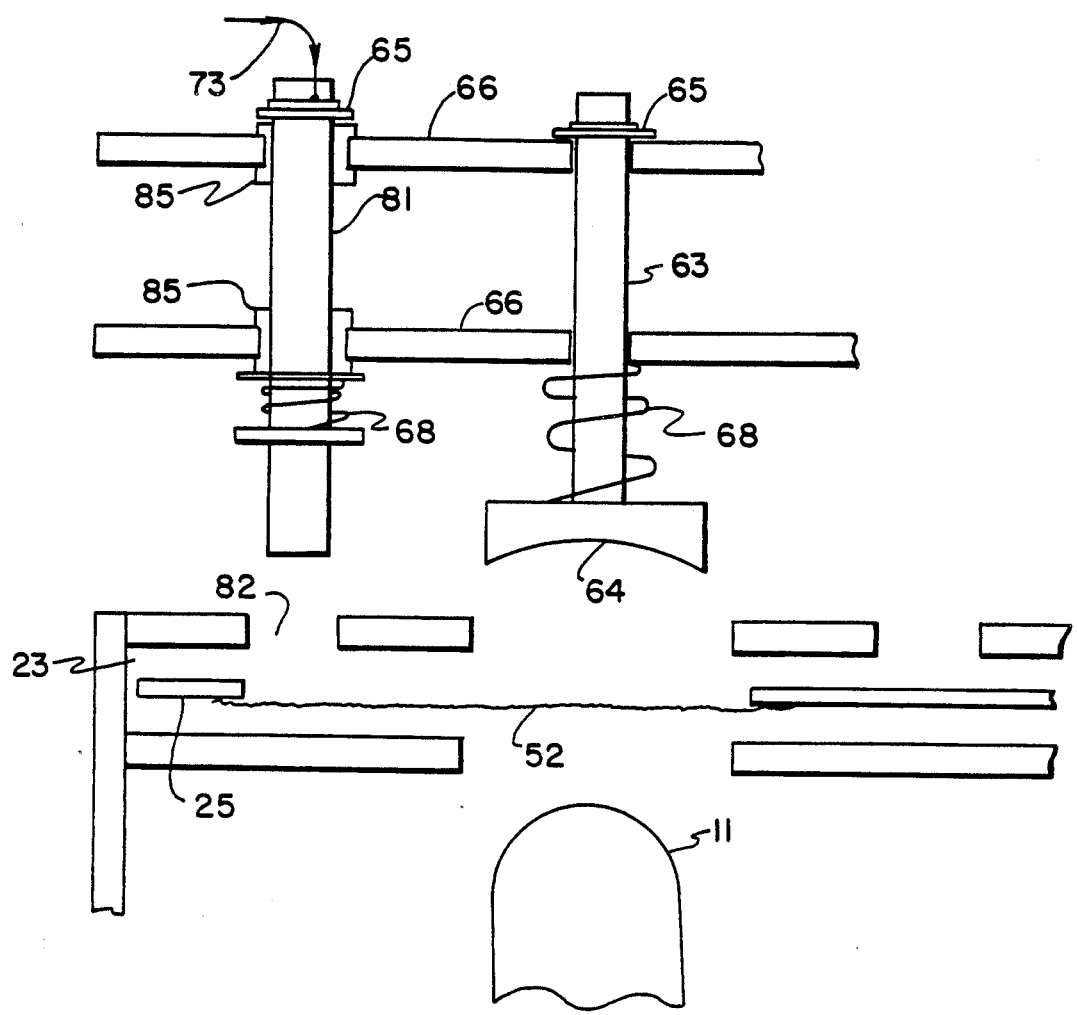
FIG. 14 is a partial schematic depicting the alternative of applying the A.C. voltage to the foil contact rods which now serve as electrodes in lieu of to the plungers.

FIG. 14 depicts a further alternate embodiment to apparatus 200 whose only change is that the apparatus 200 provides a current path 73 to the frankfurter 11, not through the plunger rod 63, but rather through the foil sensor rod 81. The plunger cup 64 which is in intimate contact with aluminum foil 52 and frankfurter 11 would be made or covered with nonconducting material or insulated. The card 25 is modified to allow the sensor rod 81, now made of conducting material, to make direct contact with the aluminum foil conductor 52 in lieu of the paper portion of card 25.

Figure 15:
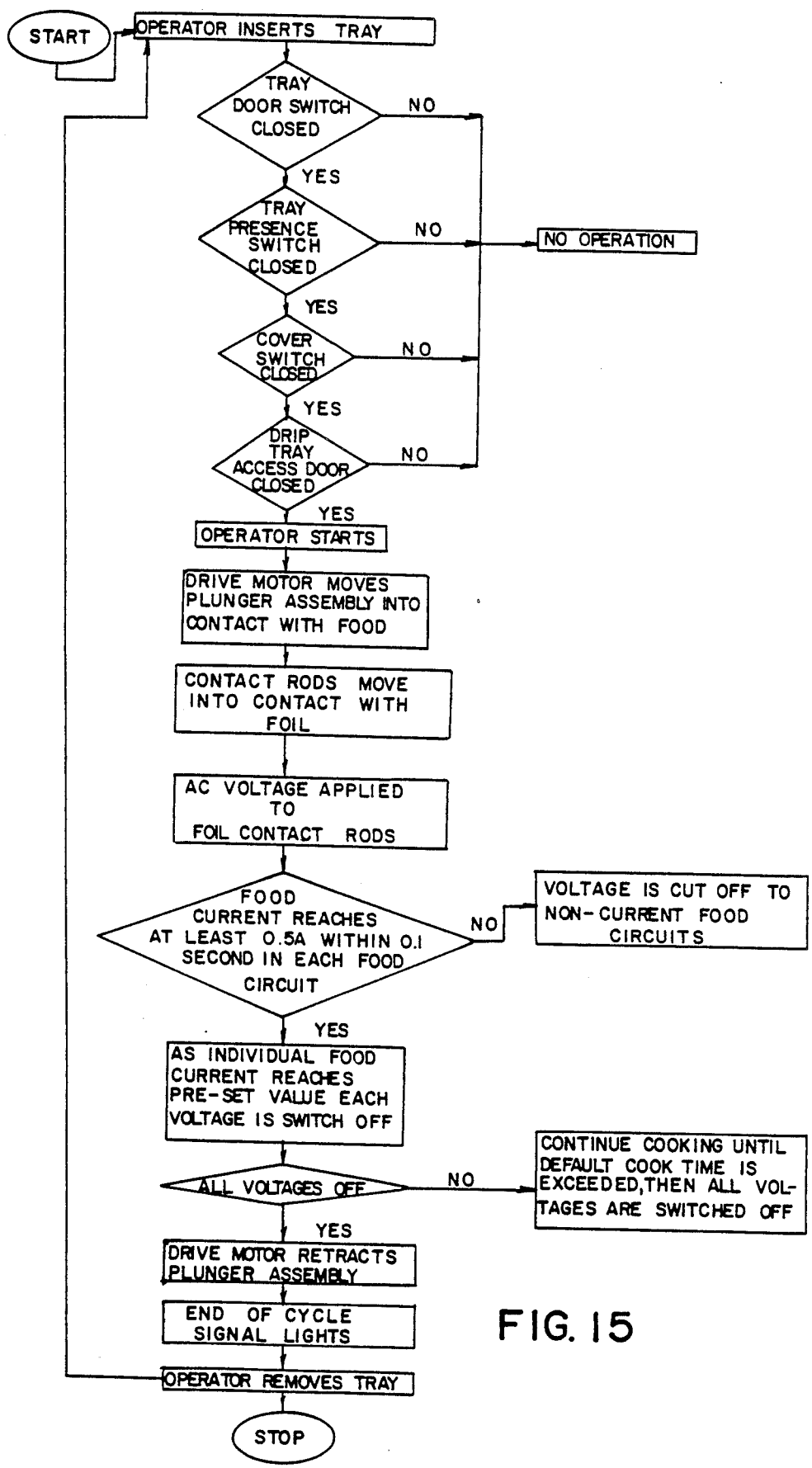
FIG. 15 is a flow chart depicting the operational sequence of events of the apparatus wherein the voltage is applied to the foil contact rods in lieu of the plunger.

FIG. 15 is the operational flow chart related to this embodiment.

While the present invention has been shown in but two major forms and a number of variations for various means, it is obvious to those skilled in the art that it is not so limited, but is susceptible to various changes and modifications to be embodied in other specific forms without departing from the scope and spirit or essential attributes thereof.

Accordingly, it is intended that the present invention embrace all alternatives, modifications and variations as fall within the spirit and broad scope of the appended claims.

What is claimed is:

1. An apparatus for cooking a processed frankfurter in a short period of time by passing an electric current through the frankfurter comprising:
   a tray with open side apertures with multiple cradle supports to accept frankfurters;
   said tray having a cover which constricts the vertical movement of the frankfurters; and a tray guide for positioning said tray;
   a cooking compartment into which said tray is inserted to activate a series of parallel electrical circuits;

electrodes for applying electric current through the frankfurter;

means to maintain the electrical conductivity between the electrodes and frankfurters to include enhancing sanitation; and control means to terminate the electrical cooking cycle.

2. An apparatus as set forth in claim 1 wherein said means of maintaining electrical conductivity between the electrodes and frankfurters includes nonconducting tape with patches of conducting material spaced thereon;

driving means for moving said tape along a predetermined path between container means and plunger means;

position counting means which transmit data on tape perforations for control of tape advance; and a microprocessor controlling tape advance and assuring alignment of conducting patches of tape with apertures of container means.

3. An apparatus as set forth in claim 1 or 2 wherein the means of maintaining the conductivity between the electrodes and frankfurter are aluminium foil or conducting plastic patches.

4. An apparatus as set forth in claim 1 wherein said control means to terminate the cooking cycle include potentiometer means to adjust the maximum current level which when reached within a cooking circuit completes the cooking cycle;

current sensing signals to determine the various levels of current in all cooking circuits; and a microprocessor for receiving said current signals and to provide current control signals.

5. An apparatus for cooking a processed frankfurter in a short period of time by passing an electric current through the frankfurter comprising:

a cooking compartment into which a tray is inserted to activate a series of parallel electrical circuits;

electrode means for applying electrical current through the frankfurter;

a tray with open side apertures with multiple cradle support to accept frankfurters said tray having a cover which constricts the vertical movement of the frankfurters; and a tray guide for positioning said tray in the cooking compartment; and recesses built into the cradles of the outside apertures to accept in proper alignment the manual insertion of nonconducting paper inserts with single or multiple aluminum foil patches to maintain the electrical conductivity between the electrodes and frankfurters; and control means to terminate the electrical cooking cycles.

6. An apparatus as set forth in claim 5 wherein said control means to terminate the cooking cycle include:

potentiometer means to adjust the maximum current level which when reached within a cooking circuit completes the cooking cycle;

current sensing signals to determine the various levels of current in all cooking circuits;

sensor means to detect the presence of the nonconducting paper which incorporates the five position conducting patches to allow the cooling circuit to be completed;

a microprocessor for receiving said current signals and to provide current control signals.

7. An apparatus for cooking a frankfurter in a short period of time by passing an electric current through the frankfurter comprising:

a container means with open apertures at both sides to accommodate multiple frankfurters and to allow for the manual insertion of means to cause electrical conduction;

a cooking compartment into which the container means is inserted to activate a series of parallel electrical circuits;

electrodes for applying electric current through the frankfurters;

means to cause electrical conductivity between the electrodes and frankfurters;

sensor means to detect the presence of the said means for causing electrical conductivity and which serve the dual purpose as the electrode for completing the current circuit through the frankfurter;

control means to terminate the cooking cycle.

8. An apparatus as set forth in claim 7 wherein said container means includes a tray with open side apertures with a multiple cradle support structure to accept frankfurters;

a cover to the said tray which constricts the vertical movement of the frankfurters;

a tray guide for positioning said tray into the cooking compartment;

recesses built into the cradles of the outside apertures of the said tray to accept in proper alignment the manual insertion of means to cause electrical conductivity between the electrodes and frankfurters.

9. An apparatus as set forth in claim 7 wherein the said means of causing electrical conductivity between the electrodes and frankfurters includes nonconducting paper inserts with single or multiple aluminum foil patches spaced so that when manually inserted into the container means the aluminum foil patches align with the opposite ends of each frankfurter.

10. An apparatus as set forth in claim 7 or 9 wherein the said sensor means for detecting the presence of the nonconducting paper insert incorporating the conducting patches of aluminum foil and for serving also as electrode includes a rod means for movement with the carriage which moves the means for applying pressure using plungers;

a microswitch which opens and closes a current circuit when in contact with the rod means depending on the presence of the nonconducting paper card insert;

wiring means to allow rod means with proper insulation to carry current to serve as electrode when in contact with the conducting material aligned with the frankfurter ends.

11. An apparatus as forth in claim 7, wherein said control means to terminate the cooking cycle include potentiometer means to adjust the maximum current level which when reached within a cooking circuit completes the cooking cycle.

current sensing signals to determine the various levels of current in all cooking circuits;

a microprocessor for receiving said current signals and to provide current control signals.

12. An apparatus as set forth in claim 7 wherein the cooking time for a frankfurter is less than 40 seconds.

13. An apparatus as set forth in claim 4 wherein the electrical current flow through a frankfurter varies between 2 and 3 amperes.

14. An apparatus as set forth in claim 4 wherein the internal temperature of the frankfurter at the end of the cooking cycle is 150 degrees Fahrenheit or may be increased or decreased depending on consumer demand.

* * * * *